United States Patent
Terada et al.

(10) Patent No.: US 11,298,772 B2
(45) Date of Patent: Apr. 12, 2022

(54) WELDING APPARATUS AND NOZZLE DEVICE

(71) Applicants: KABUSHIKI KAISHA TOSHIBA, Minato-ku (JP); TOSHIBA ENERGY SYSTEMS & SOLUTIONS CORPORATION, Kawasaki (JP)

(72) Inventors: Takahiro Terada, Yokohama (JP); Yasuaki Hadame, Arakawa (JP); Hideki Ide, Yokohama (JP)

(73) Assignees: KABUSHIKI KAISHA TOSHIBA, Minato-ku (JP); TOSHIBA ENERGY SYSTEMS & SOLUTIONS CORPORATION, Kawasaki (JP)

(*) Notice: Subject to any disclaimer, the term of this patent is extended or adjusted under 35 U.S.C. 154(b) by 210 days.

(21) Appl. No.: 16/562,718

(22) Filed: Sep. 6, 2019

(65) Prior Publication Data

US 2020/0094342 A1 Mar. 26, 2020

(30) Foreign Application Priority Data

Sep. 26, 2018 (JP) .............................. JP2018-180145

(51) Int. Cl.
*B23K 9/16* (2006.01)
*B23K 26/142* (2014.01)
(Continued)

(52) U.S. Cl.
CPC .............. *B23K 9/16* (2013.01); *B23K 26/142* (2015.10); *B23K 26/1464* (2013.01); *B23K 26/348* (2015.10)

(58) Field of Classification Search
CPC ...... B23K 9/16; B23K 26/142; B23K 26/348; B23K 26/1464
(Continued)

(56) References Cited

U.S. PATENT DOCUMENTS 2,874,265 A * 2/1959 Reed ...................... B23K 10/00
75/10.4
3,503,804 A * 3/1970 Hellmut .................. B05B 7/228
134/1

(Continued)

FOREIGN PATENT DOCUMENTS

JP 05-050284 A 3/1993
JP 09-001374 A 1/1997
(Continued)

*Primary Examiner* — Jimmy Chou
(74) *Attorney, Agent, or Firm* — Oblon, McClelland, Maier & Neustadt, L.L.P.

(57) ABSTRACT

A welding apparatus according to one embodiment includes an irradiation device and nozzle. The irradiation device irradiates a surface of an object with an energy beam. The nozzle is provided with a first channel through which a shield gas flows and a second channel apart from the first channel and through which a gas flows, and the nozzle moves in an irradiation direction. The nozzle includes an end facing the surface and an outer face connected to the end and located in the irradiation direction with respect to the first channel. The end is provided with a first opening that communicates with the first channel and allows discharge of the shield gas toward the surface. The outer face is provided with a second opening that communicates with the second channel and allows the gas to be discharged away from the outer face in the irradiation direction.

15 Claims, 5 Drawing Sheets

(51) Int. Cl.
*B23K 26/14* (2014.01)
*B23K 26/348* (2014.01)

(58) Field of Classification Search
USPC ............ 219/121.62, 121.63, 121.67, 121.39,
219/121.48, 121.84, 121.71
See application file for complete search history.

(56) References Cited

U.S. PATENT DOCUMENTS

| | | | | |
|---|---|---|---|---|
| 3,567,898 A * | 3/1971 | Fein | ................ | B23K 10/00 219/121.5 |
| 3,569,660 A * | 3/1971 | Houldcroft | .......... | B23K 26/147 219/121.68 |
| 4,000,392 A * | 12/1976 | Banas | ................ | B23K 26/0643 219/121.63 |
| 4,010,345 A * | 3/1977 | Banas | ................ | B08B 15/04 219/121.84 |
| 4,031,351 A * | 6/1977 | Martin | ................ | B23K 26/12 219/121.67 |
| 4,047,580 A * | 9/1977 | Yahiro | ................ | E02F 3/90 175/67 |
| 4,078,167 A * | 3/1978 | Banas | ................ | B23K 10/02 219/121.11 |
| 4,121,085 A * | 10/1978 | Diemer | ................ | C08F 2/005 219/121.74 |
| 4,125,757 A * | 11/1978 | Ross | ................ | B23K 26/14 219/121.67 |
| 4,288,678 A * | 9/1981 | La Rocca | .......... | B23K 26/0643 219/121.65 |
| 4,324,972 A * | 4/1982 | Furrer | ................ | B23K 26/02 219/121.63 |
| 4,642,445 A * | 2/1987 | Stol | ................ | B23K 26/12 219/121.84 |
| 4,672,171 A * | 6/1987 | Cusimano | ................ | B05B 7/226 219/121.48 |
| 4,724,299 A * | 2/1988 | Hammeke | ................ | B05B 7/1486 219/121.6 |
| 4,764,656 A * | 8/1988 | Browning | ................ | B23K 9/296 219/121.44 |
| 5,285,045 A * | 2/1994 | Ito | ................ | B23K 26/06 219/121.76 |
| 5,356,081 A * | 10/1994 | Sellar | ................ | B23K 26/142 241/1 |
| 5,359,176 A * | 10/1994 | Balliet, Jr. | ......... | B23K 26/1476 219/121.67 |
| 5,418,350 A * | 5/1995 | Freneaux | ................ | B05B 7/228 219/121.64 |
| 5,609,781 A * | 3/1997 | Kaga | ................ | B23K 26/032 219/121.67 |
| 5,660,748 A * | 8/1997 | Tanaka | ................ | B23K 26/06 219/121.6 |
| 5,705,785 A * | 1/1998 | Dykhno | ................ | B23K 28/02 219/121.45 |
| 5,728,993 A * | 3/1998 | O'Neill | ................ | B23K 26/0604 219/121.67 |
| 5,756,962 A * | 5/1998 | James | ................ | B23K 26/064 219/121.75 |
| 5,866,870 A * | 2/1999 | Walduck | ................ | B23K 28/02 219/121.45 |
| 5,902,499 A * | 5/1999 | Richerzhagen | .... | B23K 26/0648 219/121.84 |
| 5,981,901 A * | 11/1999 | La Rocca | ................ | B23K 26/123 219/121.63 |
| 6,144,010 A * | 11/2000 | Tsunemi | ................ | B08B 7/0042 219/121.68 |
| 6,198,070 B1 * | 3/2001 | Nakayama | .......... | B23K 26/1476 219/121.68 |
| 6,204,475 B1 * | 3/2001 | Nakata | ................ | B23K 26/147 219/121.84 |
| 6,248,972 B1 * | 6/2001 | Yamaguchi | ............ | B23K 10/00 219/121.39 |
| 6,313,432 B1 * | 11/2001 | Nagata | ................ | B23K 26/14 219/121.67 |
| 6,388,227 B1 * | 5/2002 | Dykhno | ................ | B23K 26/348 219/121.6 |
| 6,494,965 B1 * | 12/2002 | Walker | ................ | B08B 5/02 134/104.2 |
| 6,525,291 B1 * | 2/2003 | Sanders | ................ | B26F 3/004 219/121.39 |
| 6,583,383 B2 * | 6/2003 | Higashi | ................ | B23K 26/18 219/121.72 |
| 6,791,061 B2 * | 9/2004 | Fujii | ................ | B23K 26/123 219/121.75 |
| 6,822,187 B1 * | 11/2004 | Hermann | ........... | B23K 26/0884 219/121.63 |
| 6,833,222 B1 * | 12/2004 | Buzerak | ................ | G03F 1/64 156/267 |
| 7,038,161 B2 * | 5/2006 | Aubry | ................ | B23K 26/0665 219/121.63 |
| 7,223,935 B2 * | 5/2007 | Wessner | ............. | B23K 26/0643 219/121.64 |
| 7,241,965 B2 * | 7/2007 | Burt | ................ | B23K 26/147 219/121.63 |
| 8,134,098 B2 * | 3/2012 | Muratsubaki | ........ | B23K 26/146 219/121.67 |
| 8,207,472 B2 * | 6/2012 | Kosmowski | ........... | B23K 26/16 219/121.67 |
| 8,330,070 B2 * | 12/2012 | Sano | ................ | B23K 26/00 219/121.6 |
| 8,344,285 B2 * | 1/2013 | Sykes | ................ | B23K 26/12 219/121.68 |
| 8,710,400 B2 * | 4/2014 | Briand | ................ | B23K 26/0648 219/121.67 |
| 8,735,769 B2 * | 5/2014 | Miyagi | ................ | B23K 26/144 219/121.64 |
| 8,940,218 B1 * | 1/2015 | Lindblad | ........... | B23K 26/0861 264/400 |
| 9,061,304 B2 * | 6/2015 | Miller | ................ | B23K 26/142 |
| 10,022,820 B2 * | 7/2018 | Gaebelein | .......... | B23K 26/1462 |
| 10,092,980 B1 * | 10/2018 | Gaebelein | .......... | B23K 26/1417 |
| 10,112,261 B2 * | 10/2018 | Ohno | ................ | B33Y 40/00 |
| 10,220,473 B2 * | 3/2019 | Ohno | ................ | B33Y 40/00 |
| 10,279,417 B2 * | 5/2019 | Jogdand | ............. | B23K 10/006 |
| 10,525,554 B2 * | 1/2020 | Orlandi | ............. | B23K 26/1476 |
| 10,654,129 B2 * | 5/2020 | Broghammer | ....... | B23K 26/142 |
| 10,780,634 B2 * | 9/2020 | Ohno | ................ | B22F 12/00 |
| 10,850,350 B2 * | 12/2020 | Obara | ................ | C23C 4/123 |
| 11,040,412 B2 * | 6/2021 | Jogdand | ............. | H05H 1/3405 |
| 2002/0023905 A1 * | 2/2002 | Fukaya | ................ | B23K 26/1476 219/121.71 |
| 2002/0179582 A1 * | 12/2002 | Reichmann | ........ | B23K 26/0665 219/121.84 |
| 2003/0192865 A1 * | 10/2003 | Cole | ................ | B23K 26/1436 219/121.67 |
| 2003/0197909 A1 * | 10/2003 | Beyer | ................ | B23K 26/1494 359/509 |
| 2003/0217809 A1 * | 11/2003 | Morishige | ........ | B23K 26/03 156/345.5 |
| 2004/0112882 A1 * | 6/2004 | Miyairi | ................ | B23K 26/1476 219/121.86 |
| 2004/0188397 A1 * | 9/2004 | Connally | ................ | B23K 10/00 219/121.67 |
| 2004/0232123 A1 * | 11/2004 | Alfille | ................ | B23K 26/073 219/121.72 |
| 2005/0056628 A1 * | 3/2005 | Hu | ................ | B23K 26/144 219/121.84 |
| 2005/0103763 A1 * | 5/2005 | Momose | ................ | B23K 26/142 219/121.69 |
| 2005/0109744 A1 * | 5/2005 | Baker | ................ | B23K 26/10 219/121.84 |
| 2005/0109745 A1 * | 5/2005 | Wessner | ............. | B23K 26/0643 219/121.84 |
| 2005/0133486 A1 * | 6/2005 | Baker | ................ | B23K 26/0096 219/121.63 |
| 2005/0189331 A1 * | 9/2005 | Millard | ................ | B23K 26/1436 219/121.84 |

(56) References Cited

U.S. PATENT DOCUMENTS

| | | | | |
|---|---|---|---|---|
| 2005/0211687 A1* | 9/2005 | Sonoda | B23K 28/02 | 219/137 R |
| 2006/0043075 A1* | 3/2006 | Hershcovitch | B23K 15/10 | 219/121.36 |
| 2006/0163216 A1* | 7/2006 | Brandt | H05H 1/34 | 219/121.39 |
| 2007/0012668 A1* | 1/2007 | Kubo | B23K 26/16 | 219/121.84 |
| 2007/0012669 A1* | 1/2007 | Mori | B23K 26/123 | 219/121.84 |
| 2007/0119833 A1* | 5/2007 | Briand | B23K 26/1436 | 219/121.72 |
| 2007/0119834 A1* | 5/2007 | Briand | B23K 26/123 | 219/121.72 |
| 2007/0119837 A1* | 5/2007 | Nishiya | B23K 26/146 | 219/121.84 |
| 2007/0278195 A1* | 12/2007 | Richerzhagen | B23K 26/0665 | 219/121.69 |
| 2008/0041832 A1* | 2/2008 | Sykes | B23K 26/146 | 219/121.84 |
| 2008/0087640 A1* | 4/2008 | Miyairi | B23K 26/142 | 216/65 |
| 2008/0308538 A1* | 12/2008 | Harris | B23K 26/34 | 219/121.84 |
| 2009/0084765 A1* | 4/2009 | Muratsubaki | B23K 26/146 | 219/121.67 |
| 2009/0120917 A1* | 5/2009 | Koch | B23K 26/125 | 219/121.78 |
| 2009/0314753 A1* | 12/2009 | Kosmowski | B23K 26/147 | 219/121.72 |
| 2010/0044353 A1* | 2/2010 | Olsen | B23K 26/38 | 219/121.67 |
| 2010/0108648 A1* | 5/2010 | Koseki | B26F 3/004 | 219/121.67 |
| 2010/0217060 A1* | 8/2010 | Minehara | G21F 9/28 | 588/1 |
| 2010/0301013 A1* | 12/2010 | Conneely | B23K 26/127 | 216/83 |
| 2011/0095002 A1* | 4/2011 | Katayama | B23K 26/244 | 219/121.61 |
| 2012/0175354 A1* | 7/2012 | Abbasi | B23K 26/702 | 219/121.84 |
| 2013/0298387 A1* | 11/2013 | Kobier | B23K 26/40 | 29/623.1 |
| 2014/0251962 A1* | 9/2014 | Alfille | B23K 26/1437 | 219/121.72 |
| 2015/0352667 A1* | 12/2015 | Hemes | B23K 26/144 | 219/121.61 |
| 2016/0101483 A1* | 4/2016 | Kawada | B23K 26/1462 | 219/121.63 |
| 2016/0129527 A1* | 5/2016 | Moon | B23K 26/16 | 425/174.4 |
| 2017/0043432 A1* | 2/2017 | Yoshii | B23K 26/361 | |
| 2017/0182593 A1* | 6/2017 | Richerzhagen | B23K 26/702 | |
| 2017/0232558 A1* | 8/2017 | Kano | B23K 26/0861 | 219/121.72 |
| 2018/0093347 A1* | 4/2018 | Obara | B05B 1/24 | |
| 2018/0200832 A1* | 7/2018 | Izumi | B23K 26/382 | |
| 2018/0315627 A1* | 11/2018 | Ito | B23K 26/354 | |

FOREIGN PATENT DOCUMENTS

| | | | |
|---|---|---|---|
| JP | 2007-260708 A | 10/2007 | |
| JP | 2015-217408 A | 12/2015 | |
| JP | 2017-127893 A | 7/2017 | |
| WO | WO-9316838 A3 * | 9/1993 | B23K 26/146 |

* cited by examiner

WELDING APPARATUS AND NOZZLE DEVICE

CROSS-REFERENCE TO RELATED APPLICATIONS

This application is based upon and claims the benefit of priority from Japanese Patent Application No. 2018-180145, filed on Sep. 26, 2018, the entire contents of which are incorporated herein by reference.

FIELD

Embodiments described herein relate generally to a welding apparatus and a nozzle device.

BACKGROUND

Welding apparatuses are known, which irradiate an object with laser light for welding. Such a welding apparatus includes a nozzle that supplies a shield gas to a laser-irradiated spot of the object, in order to inhibit oxidation of the irradiated spot.

By irradiation of laser light, metal fumes occur from the irradiated spot. The nozzle is located near the irradiated spot, so that metal fumes may attach and solidify onto the surface of the nozzle. Such solidified metal particles may peel off to the object, which would cause decrease in welding yields.

DETAILED DESCRIPTION

According to one embodiment, a welding apparatus includes an irradiation device and a nozzle. The irradiation device irradiates a surface of an object with an energy beam. The nozzle is provided with a first channel through which a shield gas flows, and a second channel being apart from the first channel, through which a gas flows. The nozzle is spaced from an irradiation position of the energy beam on the surface. The nozzle moves relative to the object in an irradiation direction toward the irradiation position along the surface. The nozzle supplies the shield gas to the irradiation position. The nozzle includes an end facing the surface, and an outer face connected to the end and located in the irradiation direction with respect to the first channel. The nozzle is provided at the end with a first opening that communicates with the first channel and from which the shield gas is discharged toward the surface. The nozzle is provided with a second opening in the outer face, the second opening that communicates with the second channel and that allows the gas to be discharged away from the outer face in the irradiation direction.

First Embodiment

Figure 1:
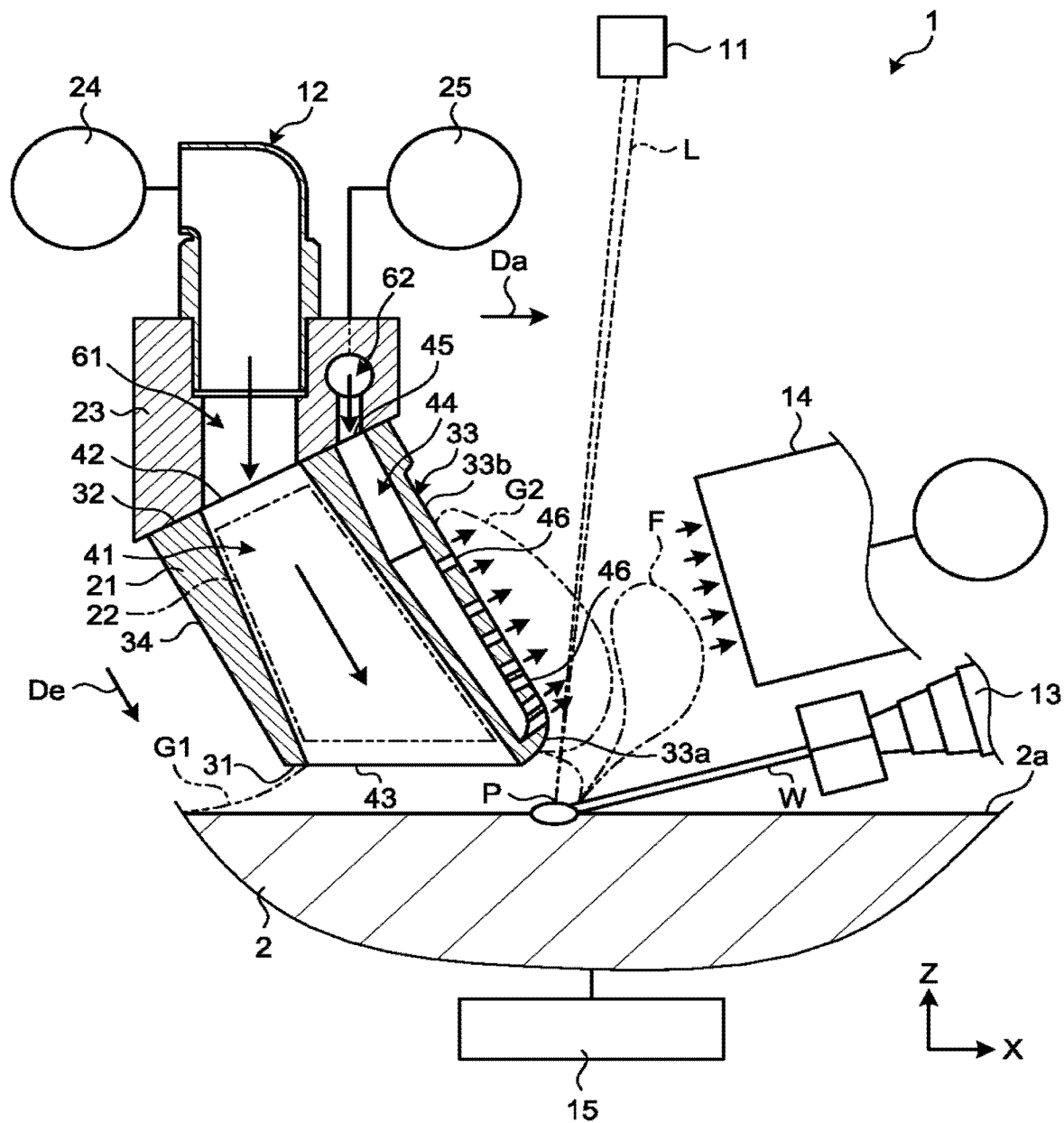
FIG. 1 is an exemplary schematic sectional view illustrating a welding apparatus according to a first embodiment.
Figure 2:
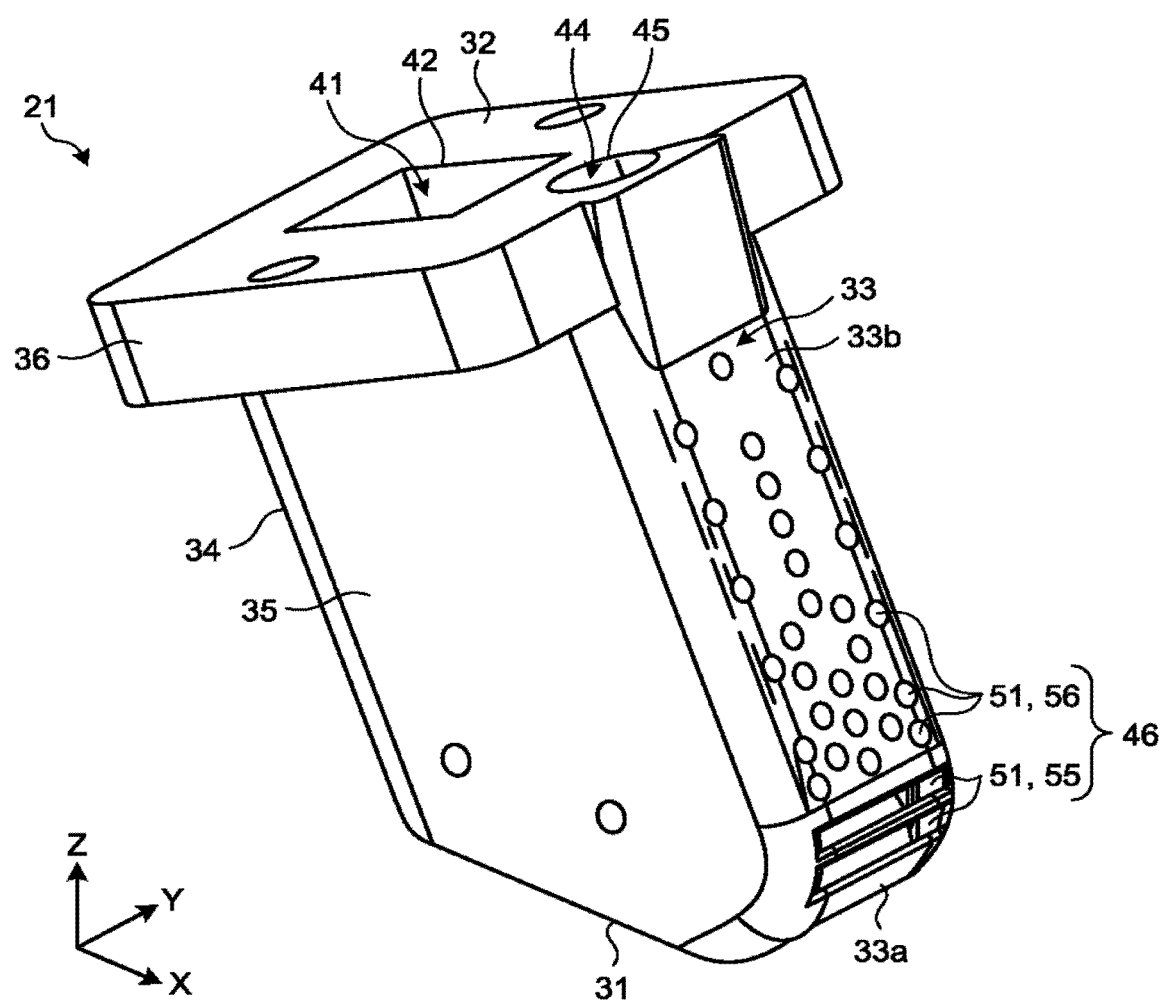
FIG. 2 is an exemplary schematic perspective view illustrating a nozzle in the first embodiment.
Figure 3:
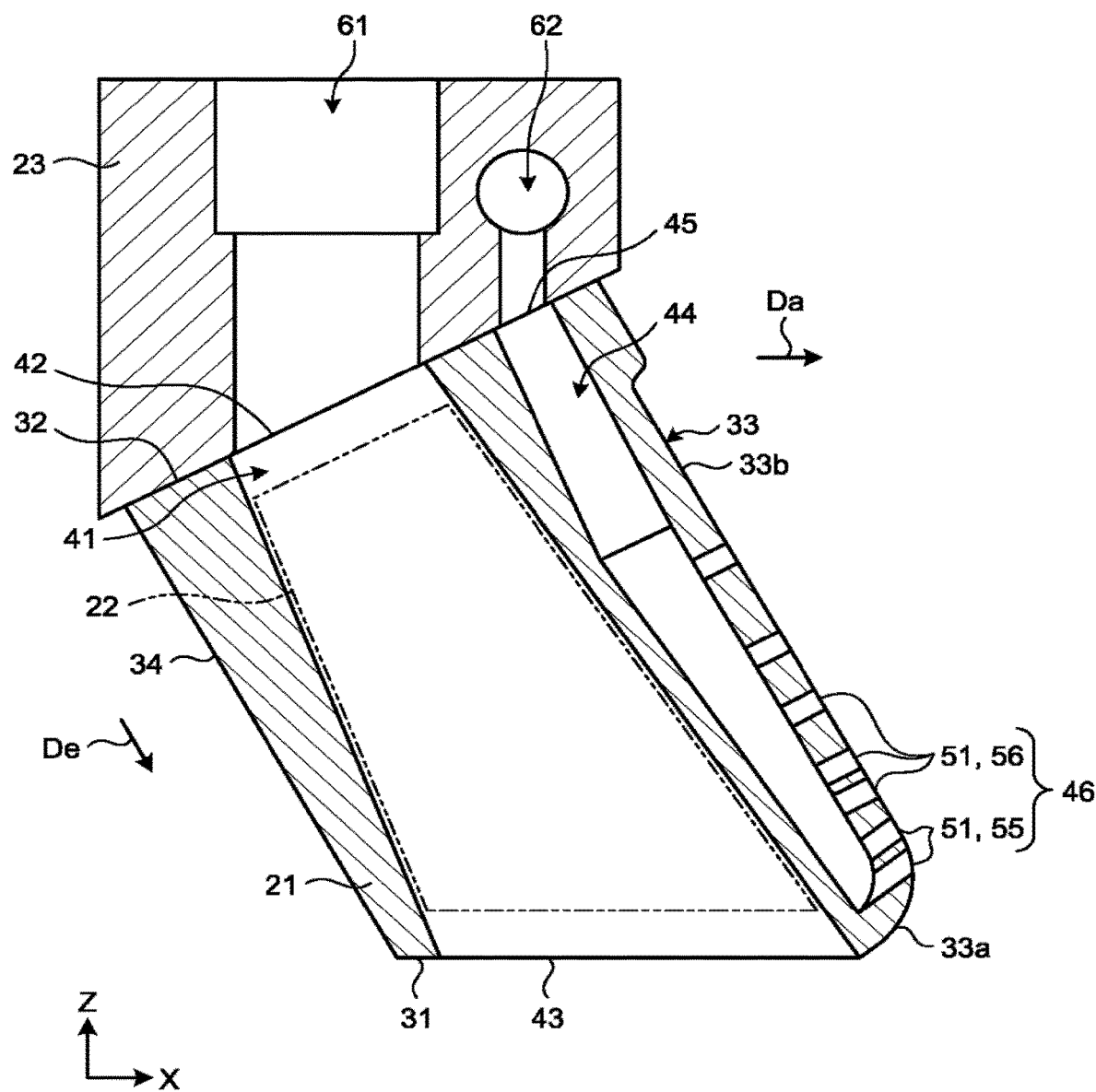
FIG. 3 is an exemplary schematic sectional view illustrating the nozzle and a manifold in the first embodiment.

The following describes a first embodiment with reference to FIGS. 1 to 3. In this disclosure, vertically upward direction is defined as an upward direction, and vertically downward direction as a downward direction for the sake of convenience. Elements may be represented by different expressions and explained in different expressions, however, such elements and their explanations are not limited by such expressions. The elements and the descriptions thereof are not limited by the expressions used herein. The elements can be identified by names different from those used herein. The elements can be described in terms different from those used herein.

FIG. 1 is an exemplary schematic sectional view illustrating a welding apparatus 1 according to the first embodiment. The welding apparatus 1 of the present embodiment welds an object 2 by laser beam welding. The welding apparatus 1 is not limited to this example, and may weld the object 2 by a combination of laser beam welding and arc welding, for example.

In the present embodiment, the object 2 represents a metallic member and has a substantially flat surface 2a. The welding apparatus 1 irradiates the surface 2a of the object 2 with laser light L for welding. The laser light L is an exemplary energy beam. The object 2 is not limited to the above example, and may have a curved surface 2a, for example.

As illustrated in the drawings, an X axis, a Y axis, and a Z axis are defined in this disclosure. The X axis, the Y axis, and the Z axis are orthogonal to one another. The axis and the Y axis are along the surface 2a. The Z axis is orthogonal to the surface 2a.

In the following, positive Z-axis direction (as indicated by the Z-axis arrow) refers to vertically upward direction and negative Z-axis direction (opposite to the Z-axis arrow) refers to vertically downward direction. Positions and directions of the welding apparatus 1 and the object 2 are not limited to the ones below.

The welding apparatus 1 includes an optical device 11, a gas feeding device 12, a wire feeding device 13, a suction device 14, and a mobile device 15. The optical device 11 is an exemplary irradiation device. The gas feeding device 12 is an exemplary nozzle device. The wire feeding device 13 may be omitted from the welding apparatus 1.

The optical device 11 is located above the object 2 to irradiate the surface 2a of the object 2 with the laser light L. The optical device 11 represents a continuous-wave laser (CW laser), for example, and includes an oscillation element that oscillates to emit the laser light L. The optical device 11 may be a pulse laser. The optical device 11 may further include, for example, a galvano scanner that moves or scans an irradiation position P of the laser light L on the surface 2a.

The gas feeding device 12 includes a nozzle 21. The nozzle 21 can also be referred to as a member, for example. The nozzle 21 alone can be an exemplary nozzle device. The nozzle 21 is located above the surface 2a and is spaced apart from the irradiation position P in negative X-axis direction (opposite to the X-axis arrow). The nozzle 21 may be partly located above the irradiation position P.

The gas feeding device 12 discharges a shield gas G1 from the nozzle 21 in a discharge direction De. The discharge direction De is an exemplary first direction. The shield gas G1 is an exemplary shield gas and an exemplary first gas. The shield gas G1 represents an inert gas, such as nitrogen, argon, and helium.

In the present embodiment, the discharge direction De is set to a diagonally downward direction between positive X-axis direction (as indicated by the X-axis arrow) and the negative Z-axis direction. The discharge direction De is not limited to this example, and may be set to the negative Z-axis direction, for example.

The discharge direction De is toward the surface 2a. Thus, the shield gas G1, discharged from the nozzle 21, comes into collision with the surface 2a and spreads along the surface 2a, and reaches the irradiation position P. In this manner, the nozzle 21 supplies the shield gas G1 to the irradiation position P. The discharge direction De may be a direction from the nozzle 21 to the irradiation position P.

The wire feeding device 13 is located apart from the irradiation position P in the positive X-axis direction. That is, the irradiation position P is located between the nozzle 21 and the wire feeding device 13 in the X-axis direction. The wire feeding device 13 supplies a wire W to the irradiation position P. The wire W can also be referred to as a welding rod, a filler metal, or an electrode, for example.

The suction device 14 is located above the wire feeding device 13 with spacing from the irradiation position P in the positive X-axis direction. Thus, the irradiation position P is set between the nozzle 21 and the suction device 14 in the X-axis direction. The suction device 14 suctions gaseous matter such as the shield gas G1, for example.

The mobile device 15 supports the object 2, for example. The mobile device 15 moves the object 2 in the X-axis direction and the Y-axis direction. Thus, the optical device 11, the gas feeding device 12, the wire feeding device 13, and the suction device 14 are moved relative to the object 2. The mobile device 15 may move the optical device 11, the gas feeding device 12, the wire feeding device 13, and the suction device 14.

The mobile device 15 moves the optical device 11, the gas feeding device 12, the wire feeding device 13, and the suction device 14 relative to the object 2 in a traveling direction Da. The traveling direction Da is an exemplary irradiation direction and an exemplary second direction, and can also be referred to as a scanning direction. The mobile device 15 can move the optical device 11, the gas feeding device 12, the wire feeding device 13, and the suction device 14 in other directions including a direction opposite to the traveling direction Da and the Y-axis direction.

In the present embodiment, the traveling direction Da corresponds to the positive X-axis direction. In other words, the traveling direction Da is along the surface 2a of the object 2 and from the nozzle 21 to the irradiation position P. Thus, the nozzle 21 is moved relative to the object 2 for a melted portion of the object 2 by the laser light L. The traveling direction Da intersects with the discharge direction De. Welding is feasible while the optical device 11, the gas feeding device 12, the wire feeding device 13, and the suction device 14 are moved relative to the object 2 in the direction opposite to the traveling direction Da.

The gas feeding device 12 further includes a mesh member 22, a manifold 23, a first regulator 24, and a second regulator 25. The first regulator 24 and the second regulator 25 may be omitted from the gas feeding device 12.

FIG. 2 is an exemplary schematic perspective view illustrating the nozzle 21 in the first embodiment. The nozzle 21 is integrally formed of metal, for example. The nozzle 21 can be easily manufactured by an additive manufacturing apparatus, such as a 3D printer, for example. The nozzle 21 may be formed of a combination of different members.

FIG. 3 is an exemplary schematic sectional view illustrating the nozzle 21 and the manifold 23 in the first embodiment. As illustrated in FIGS. 2 and 3, the nozzle 21 extends substantially in the discharge direction De. The nozzle 21 includes a first end face 31, a second end face 32, a front face 33, a rear face 34, two lateral faces 35, and a flange 36. The first end face 31 is an exemplary end. The front face 33 is an exemplary outer face. The front face 33, the rear face 34, and the lateral faces 35 are named with reference to the traveling direction Da for the sake of convenience, and their names are not intended to limit the positions and orientations of the front face 33, the rear face 34, and the lateral faces 35.

The first end face 31, the second end face 32, the front face 33, the rear face 34, and the lateral faces 35 form the outer face of the nozzle 21 that is exposed to the exterior of the nozzle 21. The first end face 31, the second end face 32, the front face 33, the rear face 34, and the lateral faces 35 may be at least partly covered by another member.

As illustrated in FIG. 1, the first end face 31 is the end of the nozzle 21 in the discharge direction De. The first d face 31 is also the end of the nozzle 21 in the negative axis direction. The first end face 31 is a substantially flat face that expands on an X-Y plane and that faces in the negative Z-axis direction. Thus, the first end face 31 is substantially in parallel with the surface 2a of the object 2. The first end face 31 faces the surface 2a with spacing. The second end face 32 is opposite the first end face 31.

The front face 33, the rear face 34, and the lateral faces 35 are located between the first end face 31 and the second end face 32. The front face 33, the rear face 34, and the lateral faces 35 are connected at one end to the first end face 31. In other words, the front face 33, the rear face 34, and the lateral faces 35 extend from the first end face 31 to the second end face 32.

The front face 33 faces in the positive direction of X-axis. In other words, the unit vector of the direction of the front face 33 includes components in the positive X-axis direction. At least part of the front face 33 is located in the positive X-axis direction of the first end face 31, the second end face 32, the rear face 34, and the lateral faces 35.

As illustrated in FIG. 3, the front face 33 includes a curved face 33a and a flat face 33b. The curved face 33a is a substantially arc-shaped face that is connected to the first end face 31 and closer to the first end face 31 than the flat surface 33b. The curved face 33a has a part facing diagonally downward or in a direction between the positive X-axis direction and the negative Z-axis direction, a part facing in the positive X-axis direction, and a part facing diagonally upward or in a direction between the positive X-axis direction and the positive Z-axis direction. The flat face 33b is a substantially flat face that extends from the curved surface 33a toward the second end face 32 and that faces diagonally upward. The front face 33 is not limited to this example.

The rear face 34 is located opposite the front face 33. The rear face 34 faces in the negative direction of the X-axis. As illustrated in FIG. 2, the lateral faces 35 face in the Y-axis direction. The flange 36 protrudes from the lateral faces 35 in the Y-axis direction. The flange 36 is attached to the manifold 23 with screws, for example.

As illustrated in FIG. 3, the nozzle 21 is provided with a first channel 41, a first inlet 42, a first outlet 43, a second channel 44, a second inlet 45, and a second outlet 46. The first outlet 43 is an exemplary first opening. The second outlet 46 is an exemplary second opening.

The first channel 41 extends in the discharge direction De inside the nozzle 21. Thus, the front face 33 is located in the positive X-axis direction (traveling direction Da) of the first channel 41 with spacing. In the present embodiment, the cross-sectional area of the first channel 41 increases in the discharge direction De. The first channel 41 is not limited to this example.

The first inlet 42 is located in the second end face 32 and communicates with the first channel 41. To put it another way, the first inlet 42 is one end of the first channel 41 that is open to the second end face 32.

The first cutlet 43 is located in the first end face 31 and communicates with the first channel 41. In other words, the first cutlet 43 is the other end of the first channel 41 that is open to the first end face 31. The first outlet 43 is open toward the surface 2a of the object 2.

The second channel 44 extends approximately in the discharge direction De inside the nozzle 21. The second channel 44 is located between the first channel 41 and the front face 33. The second channel 44 is not limited to this example. For example, the first channel 41 and the second channel 44 may be aligned in the Y-axis direction. The second channel 44 is separated from the first channel 41. In other words, the second channel 44 is independent from the first channel 41.

The second inlet 45 is located in the second end face 32 and communicates with the second channel 44. To put it another way, the second inlet 45 is one end of the second channel 44 that is open to the second end face 32.

The second outlet 46 is located in the front face 33 and communicates with the second channel 44. To put it another way, the second outlet 46 is the other end of the second channel 44 that is open to the front face 33. The second outlet 46 includes a plurality of holes 51. The holes 51 include a plurality of first holes 55 and a plurality of second holes 56.

As illustrated in FIG. 2, the first holes 55 are open to the curved face 33a of the front face 33. The first holes 55 are slits extending in the Y-axis direction. The first holes 55 are aligned in the axis direction. The first holes 55 are not limited to this example, and may be substantially circular holes, for example.

The second holes 56 are open to the flat face 33b. Thus, the second holes 56 are spaced further from the first end face 31 than the first holes 55 are. The second holes 56 are substantially circular holes. The second holes 56 are arranged in a lattice form in the Y-axis direction and the Z-axis direction, for example. The second holes 56 are not limited to this example, and may be slits, for example.

The first holes 55 are larger in size than the second holes 56. The density of the holes 51 increases toward the first end face 31. The density of the holes 51 refers to the area of the holes 51 per unit area on the front face 33.

As illustrated in FIG. 3, the mesh member 22 is placed in the first channel 41. The mesh member 22 is a member through which gas can pass, such as a mesh, a porous member, and steel wool, for example. The mesh member 22 is held in the nozzle 21 with pins, for example.

Ac illustrated in FIG. 1, the manifold 23 is provided with a first supply channel 61 and a second supply channel 62. The first supply channel 61 connects the first regulator 24 to the first inlet 42. The second supply channel 62 connects the second regulator 25 to the second inlet 45.

The first regulator 24 supplies the shield gas G1 to the first channel 41 through the first supply channel 61. The first regulator 24 includes a tank that accommodates the shield gas G1 and a valve situated between the tank and the first supply channel 61, for example. The first regulator 24 can regulate the inflow of the shield gas G1 to the first channel 41 through the valve, for example. For example, the first regulator 24 supplies or refrains from supplying the shield gas G1 to the first channel 41 and can regulate the rate of flow of the shield gas G1.

The second regulator 25 supplies a protective gas G2 to the second channel 44 through the second supply channel 62. The second regulator 25 includes a tank that accommodates the protective gas G2 and a valve situated between the tank and the second supply channel 62, for example. The second regulator 25 can regulate the inflow of the protective gas G2 to the second channel 44 through the valve, for example. For example, the second regulator 25 supplies or refrains from supplying the protective gas G2 to the second channel 44 and can regulate the rate of flow of the protective gas G2.

In the present embodiment, the protective gas G2 is identical to the shield gas G1. That is, the protective gas G2 represents an inert gas, such as nitrogen, argon, and helium. For this reason, the tank accommodating the shielding gas G1 and the tank accommodating the protective gas G2 may be the same tank. The protective gas G2 is not limited to this example, and may be other gases, such as air.

In the welding apparatus 1 described above, the optical device 11 irradiates the surface 2a of the object 2 with the laser light L while moving relative to the object 2. The laser light L melts the object 2 and the wire W for welding the object 2.

The shield gas G1 flows from the first regulator 24 into the first channel 41. The first outlet 43 allows discharge of the shield gas G1 having flowed through the first channel 41 toward the surface 2a in the discharge direction De. For example, the shield gas G1 collides with and spreads along the surface 2a and reaches the irradiation position P. Thereby, the shield gas G1 shields the irradiation position P against the atmosphere and inhibits oxidation of the object 2 at the irradiation position P.

As the object 2 and the wire W are melted by the laser light L, metal fumes F occur from the irradiation position P. The metal fumes F include steam resulting from the evaporation of the object 2 and the wire W, and particles resulting from the agglomeration of the steam. The metal fumes F rise substantially upward from the irradiation position P. Thus, the nozzle 21, which moves relative to the object 2 in the traveling direction Da, approaches the metal fumes F.

The protective gas G2 flows from the second regulator 25 into the second channel 44. The holes 51 of the second outlet 46 allow discharge of the protective gas G2 having flowed through the second channel 44 in the positive X-axis direction or diagonally upward, i.e., in the direction between the positive X-axis direction and the positive Z-axis direction. The holes 51 may include the holes 51 from which the protective gas G2 is discharged in the positive X-axis direction and the holes 51 from which the protective gas G2 is discharged diagonally upward.

The positive x-axis direction is directed away from the front face 33 in the traveling direction Da, and parallel to the surface 2a. The diagonally upward direction is directed away from the front face 33 in the traveling direction Da and away from the surface 2a.

The protective gas G2 is discharged from the holes 51, forming a layer near the front face 33. The layer of the protective gas G2 intervenes between the front face 33 and the metal fumes F, inhibiting the metal fumes F from attaching to the front face 33.

The protective gas G2, discharged from the second outlet 46, carries away the metal fumes F in the traveling direction Da. Discharged from the first outlet 43, the shield gas G1 also carries away the metal fumes F in the traveling direction Da while spreading along the surface 2a. This prevents the metal fumes F from approaching and attaching to the front face 33.

The suction device 14 suctions the shield gas G1 and the protective gas G2. This creates the flow of the shield gas G1 and the protective gas G2 from the nozzle 21 to the suction device 14. The suction device 14 suctions the metal fumes F along with the flow. This prevents the metal fumes F from approaching and attaching to the front face 33.

In the welding apparatus 1 according to the first embodiment described above, the nozzle 21 includes the first end face 31 that faces the surface 2a, and the front face 33 that is connected to the first end face 31 and is located in the traveling direction Da of the first channel 41. The first end face 31 is provided with the first outlet 43 that communicates with the first channel 41 and that allows the shield gas G1 to be discharged toward the surface 2a in the discharge direction De. The front face 33 is provided with the second outlet 46 that communicates with the second channel 44 and that allows the protective gas G2 to be discharged away from the front face 33 in the traveling direction Da. As the nozzle 21 moves in the traveling direction Da, the front face 33 of the nozzle 21 moves toward the metal fumes F occurring at the irradiation position P. The protective gas G2 is discharged from the second outlet 46 in the front face 33, and the layer of the protective gas G2 intervenes between the metal fumes F and the front face 33, thereby inhibiting the metal fumes F from attaching to the front face 33. Thereby, the metal fumes F are prevented from peeling off from the front face 33 to the object 2, which would otherwise occur to lower welding yields.

The protective gas G2 discharged from the second outlet 46 is identical to the shield gas G1. Thus, the protective gas G2 discharged from the second outlet 46 is avoided from exerting a different influence on the welding from the shield gas G1.

The first regulator 24 regulates the inflow of the shielding gas G1 into the first channel 41 whereas the second regulator 25 regulates the inflow of the protective gas G2 into the second channel 44. This enables independent regulations of the rate of flow of the shield gas G1 supplied to the irradiation position P and the rate of flow of the protective gas G2 for protecting the front face 33. Thus, the rate of flow of the shield gas G1 and the rate of flow of the protective gas G2 will not limit one another.

The closer to first end face 31 and to the irradiation position P the front face 33 is, the more likely the metal fumes F attach to front face 33. In the present embodiment, the second outlet 46 includes the first holes 55 and the second holes 56 that are spaced further from the first end face 31 than the first holes 55 are. The first holes 55 are larger in size than the second holes 56. This works to heighten the rate of flow of the protective gas G2 discharged from the first holes 55 closer to the first end face 31 than the rate of flow of the protective gas G2 discharged from the second holes 56 farther from the first end face 31, thereby inhibiting the metal fumes F from attaching to part of the front face 33 close to the first end face 31.

The second outlet 46 allows the protective gas G2 to be discharged in the direction parallel to the surface 2a or in the direction away from the surface 2a. This inhibits the protective gas G2 discharged from the second outlet 46 from interfering with the shielding gas G1. Thus, the protective gas G2 will not cause a vortex of the shielding gas G1, which would be otherwise caused by the interference, preventing occurrence of oxidation at the irradiation position P.

The closer to the first end face 31 and to the irradiation position P the front face 33 is, the more likely the metal fumes P attach to the front face 33. In the present embodiment, the second outlet 46 includes the holes 51. The density of the holes 51 increases toward the first end face 31. Thereby, a higher rate of flow of the protective gas G2 is discharged from the holes 51 closer to the first end face 31 than the rate of flow of the protective gas G2 discharged from the holes 51 farther from the first end face 31, thereby inhibiting the metal fumes F from attaching to part of the front face 33 close to the first end face 31.

The suction device 14 is spaced from the irradiation position P in the traveling direction Da to suction the protective gas G2. This increase the flow of the protective gas G2 from the second outlet 46 to the suction device 14. Thus, the protective gas G2 carries away the metal fumes F toward the suction device 14, inhibiting the metal fumes F from attaching to the front face 33.

Second Embodiment

Figure 4:
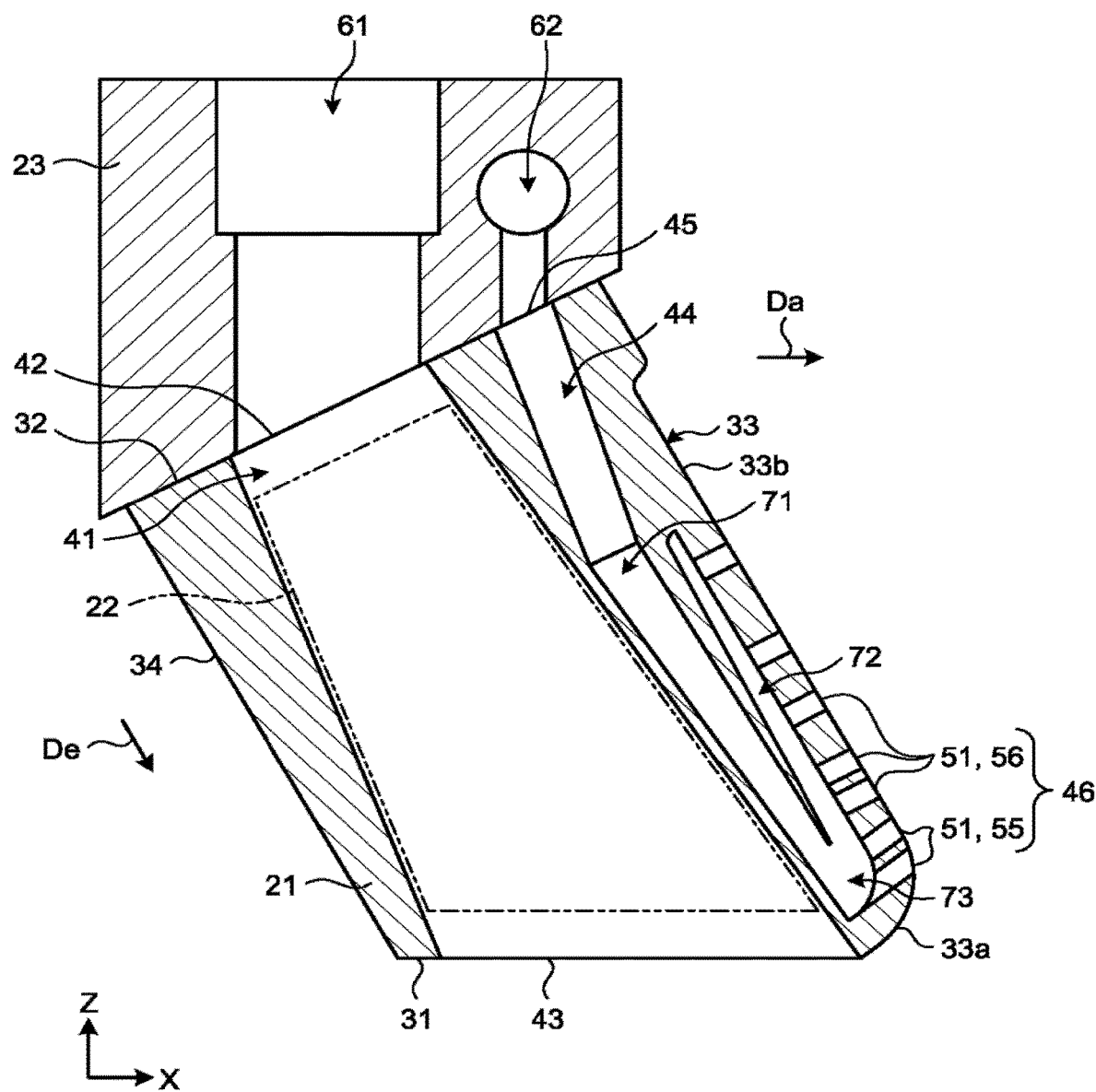
FIG. 4 is an exemplary schematic sectional view illustrating a nozzle and a manifold according to a second embodiment.

The following describes a second embodiment with reference to FIG. 4. In the following embodiments, elements having same or similar functions as the above-described elements may be denoted by the same reference signs and the descriptions thereof may be omitted. The elements denoted by the same reference signs do not necessarily have common functions and properties, and the elements may have different functions and properties depending on the embodiments.

FIG. 4 is an exemplary schematic sectional view illustrating the nozzle 21 and the manifold 23 according to the second embodiment. As illustrated in FIG. 4, the second channel 44 of the second embodiment includes a first part 71, a second part 72, and a third part 73.

The second inlet 45 communicates with the first part 71. To put it another way, the second inlet 45 is one end of the first part 71 that is open to the second end face 32. Thus, the protective gas G2 flows into the first part 71 through the second supply channel 62.

The second part 72 is located between the first part 71 and the front face 33. In other words, the second part 72 is closer to the front face 33 than the first part 71 is. The second part 72 is not limited to this example. For example, the first part 71 and the second part 72 may be aligned in the Y-axis direction. The second outlet 46 communicates with the second part 72.

The third part connects the first part 71 and the second part 72 at a position closer to the first end face 31 than at least part of the second outlet 46 is. In the present embodiment, the third part 73 connects the other end of the first part 71 and the other end of the second part 72 at a position closer to the first end face 31 than the second holes 56 of the second outlet 46 are. That is, the second holes 56 are located downstream of the third part 73. Meanwhile, the distance between the first holes 55 and the first end face 31 is substantially equal to the distance between the third part 73 and the first end face 31.

The second regulator 25 supplies the protective gas G2 to the first part 71 through the second supply channel 62. The protective gas G2 flows from the first part 71 to the second part 72 through the third part 73.

In the second embodiment, the first holes 55 communicate with the second channel 44 upstream of the second holes 56. Consequently, the protective gas G2 reaches the first holes 55 before the second holes 56. The protective gas G2 is discharged from the first holes 55 at a higher flow rate than from the second holes 56.

As described above, the closer to the first end face 31 and to the irradiation position P the front face 33 is, the more likely the metal fumes F attach to the front face 33. In the welding apparatus 1 of the second embodiment, the second channel 44 includes the first part 71 into which the protective gas G2 flows, the second part 72 that communicates with the second outlet 46, and the third part 73 that connects the first part 71 and the second part 72 at a position closer to the first end face 31 than at least part of the second outlet 46 is. Thereby, the protective gas G2, having flowed from the first part 71 into the second part 72 through the third part 73, can be discharged from part of the second outlet 46 close to the first end face 31. This increases the rate of flow of the protective gas G2 discharged from the second outlet 46 toward the first end face 31, thereby inhibiting the metal fumes F from attaching to the part of the front face 33 close to the first end face 31.

Third Embodiment

Figure 5:
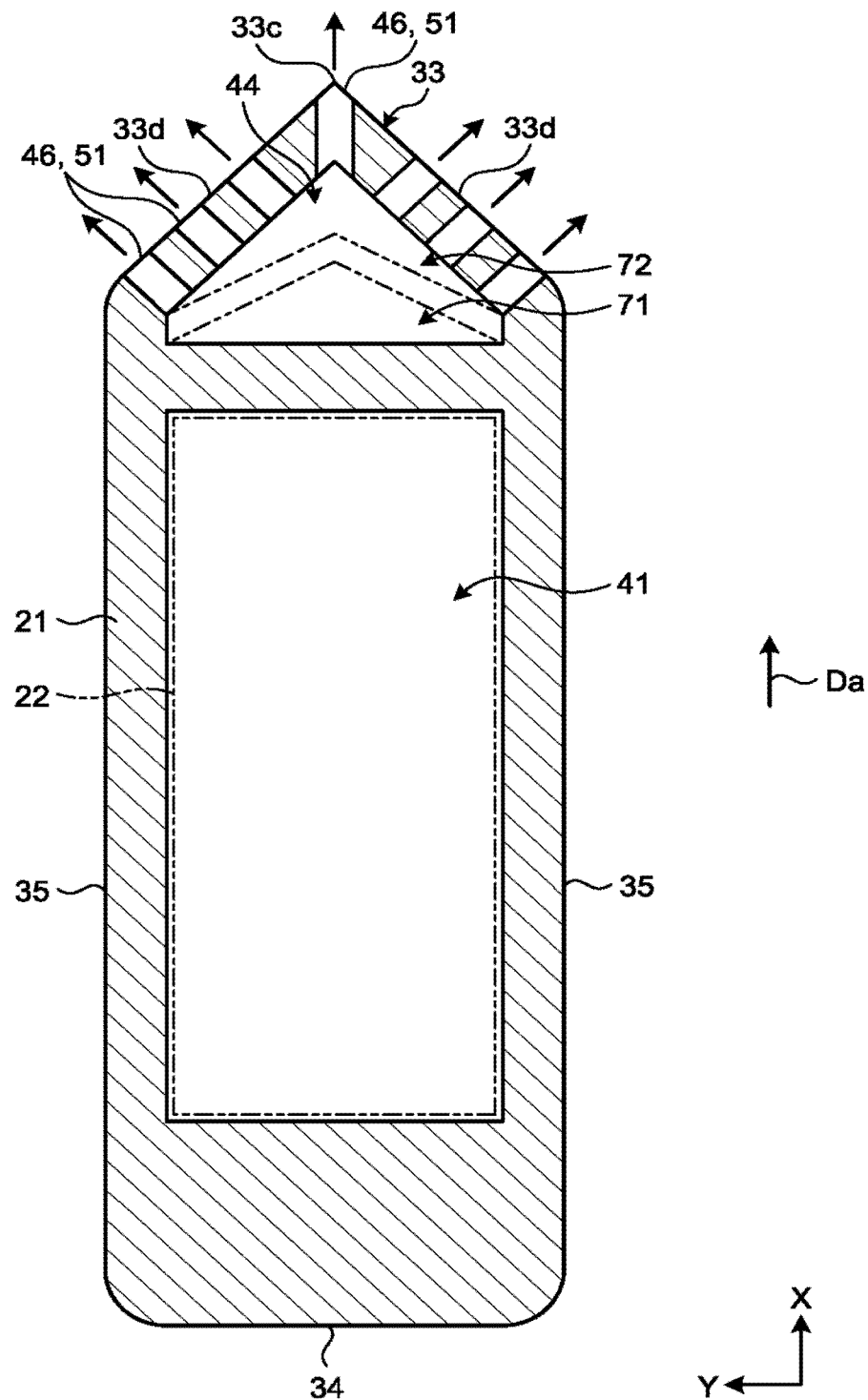
FIG. 5 is an exemplary schematic sectional view illustrating a nozzle according to a third embodiment.

The following describes a third embodiment with reference to FIG. 5. FIG. 5 is an exemplary schematic sectional view illustrating the nozzle 21 according to the third embodiment. As illustrated in FIG. 5, the front face 33 in the third embodiment has a different shape from that in the second embodiment. The first part 71 and the second part 72 of the third embodiment, as shown separately by dash-dot-dot lines in FIG. 5, can be applied to the welding apparatus 1 of the first embodiment.

In the third embodiment, the front face 33 has a protruded shape in the positive X-axis direction (traveling direction Da). For example, the front face 3 includes a top part 33c and oblique parts 33d. The top part 33c is located in the positive X-axis direction of the oblique parts 33d and the lateral faces 35. The oblique parts 33d are located between the top part 33c and the respective lateral faces 35, and extend to the top part 33c in the positive X-axis direction. The top part 33c and the oblique parts 33d provided with the holes 51 of the second outlet 46.

In the example of FIG. 5, the top part 33c is located substantially in the center of the front face 33 in the Y-axis direction. The top part 33c is, however, not limited to this example. For example, the top part 33c may be located in substantially the same position as one of the lateral faces 35 in the Y-axis direction.

In the example of FIG. 5, the oblique parts 335 are substantially flat. The oblique parts 33d are, however, not limited to this example. For example, the oblique parts 33d may be recessed or protruded from a virtual plane between the top part 33c and the lateral faces 35.

In the welding apparatus 1 of the third embodiment described above, the front face 33 has a protruded shape in the traveling direction Da. In other words, the front face 33 is substantially streamlined, so that the metal fumes F can flow along the front face 33. This inhibits the metal fumes F from attaching to the front face 33. Also, the second outlet 46 provided to the top part 33c serves to inhibit the metal fumes F from attaching to the top part 33c.

In the first to third embodiments, the second outlet 46 includes the holes 51. The second outlet 46 may be, however, a single hole as a slit that extends in the discharge direction De. The second outlet 46 may be provided not only to the front face 33 but also to the lateral faces 35.

According to at least one of the first to third embodiments, the nozzle includes an end that faces a surface, and an outer face that extends from the end and that is located in the irradiation direction with respect to a first channel. The end is provided with a first opening that communicates with the first channel and that allows a shield gas to be discharged toward the surface. The outer face is provided with a second opening that communicates with a second channel and that allows a gas to be discharged away from the outer face in the irradiation direction. As the nozzle moves in the irradiation direction, the outer face of the nozzle moves toward metal fumes occurring at the irradiation position. However, the gas discharged from the second opening in the outer face forms a layer and intervenes between the metal fumes and the outer face, thereby inhibiting the metal fumes from attaching to the outer face. This leads to preventing a decrease in welding yields, which would otherwise occur due to the attached metal fumes peeling off from the outer face to an object.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended cover such forms or modifications as would fall within the scope and spirit of the inventions.

What is claimed is:

1. A welding apparatus, comprising:
    an irradiation device that irradiates a surface of an object with an energy beam; and
    a nozzle that:
        is provided with a first channel through which a shield gas flows, and a second channel being apart from the first channel, through which a gas flows,
        is spaced from an irradiation position of the energy beam on the surface,
        moves relative to the object in an irradiation direction toward the irradiation position along the surface, and
        supplies the shield gas to the irradiation position, wherein
    the nozzle includes an end facing the surface, and an outer face connected to the end and located between the energy beam and the first channel,
    the nozzle is provided at the end with a first opening that communicates with the first channel and from which the shield gas is discharged toward the surface,
    the nozzle is provided with a second opening in the outer face, the second opening that communicates with the second channel and that allows the gas to be discharged away from the outer face in the irradiation direction, and
    the second channel includes:
        a first part into which the gas flows;
        a second part that communicates with the second opening; and
        a third part that connects the first part and the second part at a position closer to the end than at least part of the second opening.

2. The welding apparatus according to claim 1, wherein the gas is identical to the shield gas.

3. The welding apparatus according to claim 1, further comprising:
    a first regulator that regulates an inflow of the shield gas to the first channel; and
    a second regulator that regulates an inflow of the gas to the second channel.

4. The welding apparatus according to claim 1, wherein the second opening includes a first hole and a second hole that is spaced further from the end than the first hole, and
    the first hole is larger in size than the second hole.

5. The welding apparatus according to claim 1, wherein the second opening allows discharge of the gas in a direction parallel to the surface or away from the surface.

6. The welding apparatus according to claim 1, wherein the outer face has a protruded shape in the irradiation direction.

7. The welding apparatus according to claim 1, wherein the second opening includes a plurality of holes, and the holes increases in density toward the end.

8. The welding apparatus according to claim 1, further comprising
a suction device that is spaced apart from the irradiation position in the irradiation direction and that suctions the gas.

9. A welding apparatus, comprising:
an irradiation device that irradiates a surface of an object with an energy beam; and
a nozzle that:
is provided with a first channel through which a shield gas flows, and a second channel being apart from the first channel, through which a gas flows,
is spaced from an irradiation position of the energy beam on the surface,
moves relative to the object in an irradiation direction toward the irradiation position along the surface, and
supplies the shield gas to the irradiation position, wherein
the nozzle includes an end facing the surface, and an outer face connected to the end and located between the energy beam and the first channel,
the nozzle is provided at the end with a first opening that communicates with the first channel and from which the shield gas is discharged toward the surface,
the nozzle is provided with a second opening in the outer face, the second opening that communicates with the second channel and that allows the gas to be discharged away from the outer face in the irradiation direction,
the second opening includes a plurality of holes, and
the holes increases in density toward the end.

10. The welding apparatus according to claim 9, wherein the gas is identical to the shield gas.

11. The welding apparatus according to claim 9, further comprising:
a first regulator that regulates an inflow of the shield gas to the first channel; and
a second regulator that regulates an inflow of the gas to the second channel.

12. The welding apparatus according to claim 9, wherein
the second opening includes a first hole and a second hole that is spaced further from the end than the first hole, and
the first hole is larger in size than the second hole.

13. The welding apparatus according to claim 9, wherein the second opening allows discharge of the gas in a direction parallel to the surface or away from the surface.

14. The welding apparatus according to claim 9, wherein the outer face has a protruded shape in the irradiation direction.

15. The welding apparatus according to claim 9, further comprising a suction device that is spaced apart from the irradiation position in the irradiation direction and that suctions the gas.

* * * * *